(12) United States Patent
Balan et al.

(10) Patent No.: US 11,018,994 B2
(45) Date of Patent: May 25, 2021

(54) AUTOMATED NETWORK CHANGE SYSTEM

(71) Applicant: Google LLC, Mountain View, CA (US)

(72) Inventors: Horia Vlad Balan, Mountain View, CA (US); Zengbin Zhang, Seattle, WA (US); Amin Vahdat, Los Altos, CA (US); Vinay Kumar Bannai, Sunnyvale, CA (US); Alexander Jinhon Lin, San Jose, CA (US); Anvesh Komuravelli, Santa Clara, CA (US); Steven Gribble, Mountain View, CA (US); Andrew DeBock Ferguson, New York, NY (US); Muhammad Mukarram Tariq, San Jose, CA (US); Joon Ong, Cupertino, CA (US); Alvaro Martinez Echevarria, Mountain View, CA (US)

(73) Assignee: Google LLC, Mountain View, CA (US)

( * ) Notice: Subject to any disclaimer, the term of this patent is extended or adjusted under 35 U.S.C. 154(b) by 125 days.

(21) Appl. No.: 16/265,754

(22) Filed: Feb. 1, 2019

(65) Prior Publication Data

US 2019/0173805 A1 Jun. 6, 2019

Related U.S. Application Data

(63) Continuation of application No. PCT/US2018/064054, filed on Dec. 5, 2018.
(Continued)

(51) Int. Cl.
*H04L 12/933* (2013.01)
*H04L 12/947* (2013.01)
(Continued)

(52) U.S. Cl.
CPC ............ *H04L 49/15* (2013.01); *H04L 41/082* (2013.01); *H04L 41/0846* (2013.01);
(Continued)

(58) Field of Classification Search
CPC ..... H04L 49/15; H04L 41/0846; H04L 49/25; H04L 41/082; H04L 45/58;
(Continued)

(56) References Cited

U.S. PATENT DOCUMENTS

2013/0044636 A1 2/2013 Koponen et al.
2016/0149760 A1 5/2016 Voit et al.
(Continued)

FOREIGN PATENT DOCUMENTS

EP 1083483 3/2001

OTHER PUBLICATIONS

'www.cisco.com' [online] "Cisco IOS High Availability (HA)—In-Service Software Upgrade (ISSU) Technical Overview," Available on or before Feb. 4, 2015, [retrieved on Jan. 23, 2019] Retrieved from Internet: URL<https://www.cisco.com/c/dam/en/us/products/collateral/ios-nx-os-software/high-availability/prod_presentation0900aecd80456cb8.pdf> 24 pages.
(Continued)

*Primary Examiner* — Justin T Van Roie
(74) *Attorney, Agent, or Firm* — Fish & Richardson P.C.

(57) ABSTRACT

Methods, systems, and apparatus, for automatically changing a network system. A method includes receiving a set of first intents that describe a state of a first switch fabric; receiving a set of second intents that describe a state of a second switch fabric; computing a set of network operations to perform on the first switch fabric to achieve the second switch fabric, the set of operations also defining an order in which the operations are to be executed, and the set of operations determined based on the set of first intents, the set
(Continued)

of second intents, and migration logic that defines a ruleset for selecting the operations based on the set of first intents and the second intents; and executing the set of network operations according to the order, to apply changes to elements within the first switch fabric to achieve the state of the second switch fabric.

20 Claims, 9 Drawing Sheets

Related U.S. Application Data

(60) Provisional application No. 62/594,990, filed on Dec. 5, 2017.

(51) Int. Cl.
*H04L 12/24* (2006.01)
*H04L 12/775* (2013.01)

(52) U.S. Cl.
CPC .............. *H04L 45/58* (2013.01); *H04L 49/25* (2013.01); *H04L 41/0886* (2013.01)

(58) Field of Classification Search
CPC ..... H04L 41/0886; H04L 45/28; H04L 49/65; H04L 45/04; H04L 45/42; H04L 45/64
See application file for complete search history.

(56) References Cited

U.S. PATENT DOCUMENTS

2017/0064009 A1 3/2017 Baltar et al.
2018/0367652 A1* 12/2018 Dixit ..................... H04L 41/12

OTHER PUBLICATIONS

Reitblatt et al. "Abstractions for Network Update," SIGCOMM, Aug. 13-17, 2012, 12 pages.
PCT International Search Report and Written Opinion issued in International Application No. PCT/US2018/064054, dated Feb. 22, 2019, 14 pages.
PCT International Preliminary Report on Patentability in International Application No. PCT/US2018/064054, dated Jun. 18, 2020, 8 pages.
EP Office Action in European Application No. 18830089.1, dated Sep. 28, 2020, 6 pages.

* cited by examiner

Fabric State
Intent Hierarchy

CBR Migration Steps: Roll Back

Traffic Migration Steps: Roll Forward

AUTOMATED NETWORK CHANGE SYSTEM

CROSS-REFERENCE TO RELATED APPLICATIONS

This application is a continuation application of, and claims priority to, PCT Patent Application No. PCT/US2018/064054, titled "AUTOMATED NETWORK CHANGE SYSTEM," filed on Dec. 5, 2018, which application claims the benefit under 35 U.S.C. § 119(e) of U.S. Patent Application No. 62/594,990, entitled "Automated Network Change System," filed Dec. 5, 2017. The disclosure of the foregoing applications are incorporated herein by reference in their entirety for all purposes.

BACKGROUND

A network requires changes and updates over time. Such changes and updates can include introduction of new capabilities, software or firmware updates, and the like. Given the size of some networks, such changes can require many individual changes to the software, firmware and configurations of the network.

To apply these changes, network operators must examine the network and decide upon an ordered "recipe" of steps that are tailored to the specific network. The overall success of the change implementation depends on the correct ordering of the individual change operations, and compatibility of the changes.

Creating such unique recipes is time-consuming and prone to error. For example, complex interdependencies are difficult to discern. Moreover, unless the operator is aware of specific dependency requirements, what appears to be a sound change plan on paper may, in fact, result in failure. When several operators are involved, the likelihood of contradictory or incompatible changes being implemented increases.

Thus, there is a need in the technological area of network management to implement changes in a systematic and consistent manner.

SUMMARY

This specification describes technologies relating to automatically creating a workflow of changes that implement a desired change in a network from a first state to a second state. In some implementations, network changes are described in a plan for making changes as a directed graph (the "workflow"). Each node in the graph, described by an intent, describes an intended state for the network. Each edge in the graph represents a transition from one state to another. The system computes the changes necessary to change the network from the first state to the second state, and may automatically perform multiple parallel operations to implement the computed changes.

In general, one innovative aspect of the subject matter described in this specification can be embodied in methods that include the actions of receiving a set of first intents, wherein the set of first intents describes a state of a first switch fabric; receiving a set of second intents, wherein the set of second intents describes a state of a second switch fabric; computing, by an intent translator executing on the data processing system, a set of network operations to perform on the first switch fabric to achieve the second switch fabric, the set of operations also defining an order in which the operations are to be executed, and the set of operations determined based on the set of first intents, the set of second intents, and migration logic that defines a ruleset for selecting the operations based on the set of first intents and the second intents; and executing, by an operation runner executing on the data processing system, the set of network operations according to the order, to apply changes to elements within the first switch fabric to achieve the state of the second switch fabric. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The set of ordered operations is determined by the intent translator that implements a translation logic that is applied to a set of intents that describe a current fabric state and an intended fabric state. The translation logic enables the automatic generation of the set of order operations while relieving human operators of the complexity of determining the operations. The resulting operations and their execution according to a specified order are far less likely to result in configuration failures and incompatibilities that would otherwise result from manual determinations and execution of operations. This is a technological improvement in the field of network maintenance and management.

The intent translator may be a stateless translator that takes two inputs, the current fabric state and the intended fabric state, to produce the ordered set of operations. Once a state is verified, further changes may thus be effected by reference to intents that described the current verified state. This frees up the system from complex version interdependencies that must be tracked and maintained by a stateful change systems. This is yet another technological improvement in the field of network management.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

Figure 1:
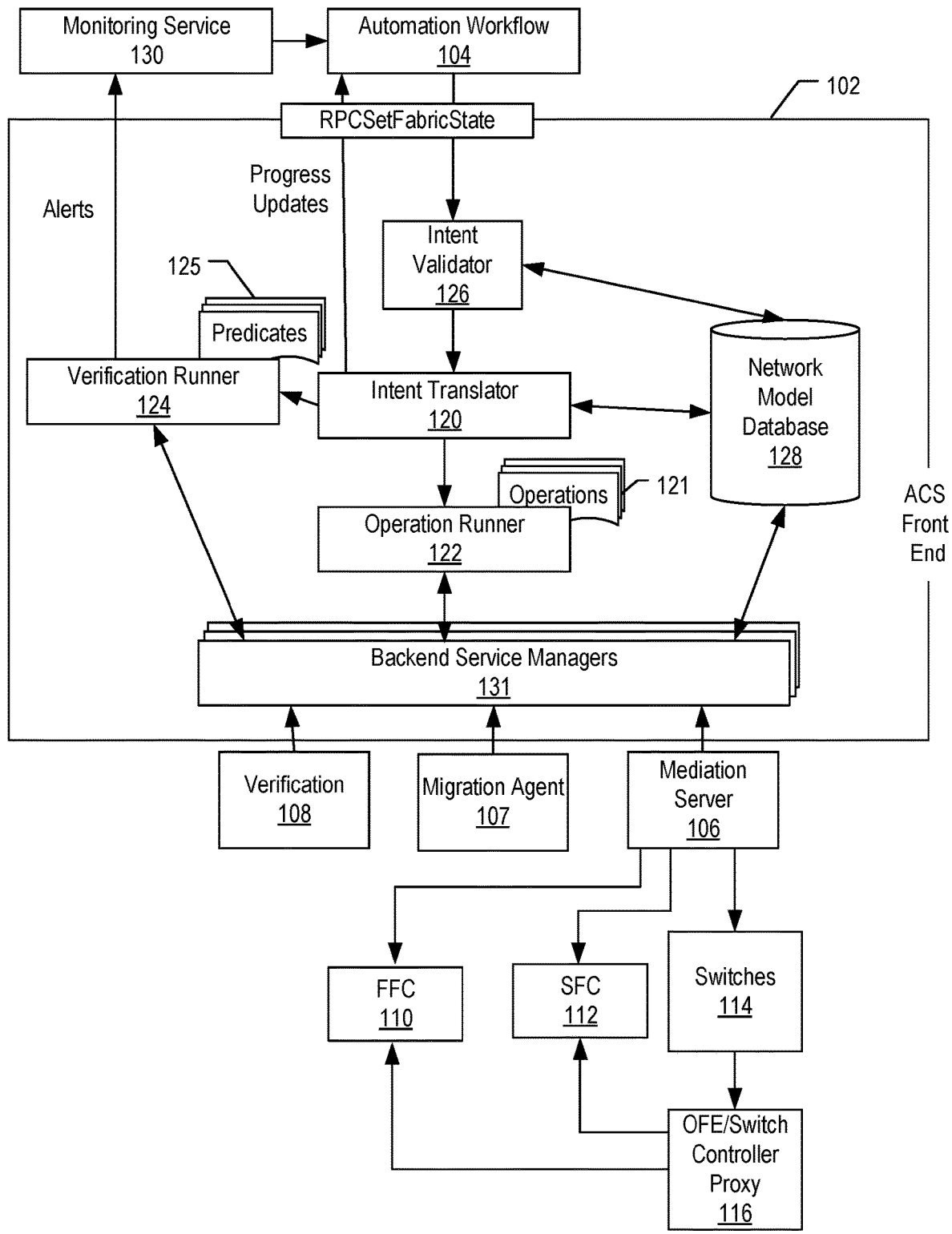
FIG. 1 is a system diagram of an example automated network change system.

A network operator wishes to make a significant (e.g., introduction of new capabilities, software upgrades, etc.), non-incremental change to a network. The change requires many individual changes to the software and configuration of the network. There is an overarching need to do this safely and in a manner that does not result is data loss or system corruption.

Each network is unique, and thus the process of applying a change to each network is defined by a unique set of steps specific to that network. To apply this change to each unique network, an ordered "recipe" of steps needs to be developed and tailored to each network since the safety and success of the overall operations depends on the correct ordering of the individual change operations. Manually creating such unique recipes is time-consuming and error prone.

To enable the rapid development and execution of a network change for unique networks, the automated network change system automatically creates such workflows for each unique network, and executes the workflows accordingly.

The network operator describes the plan for making change by a current intent and an intended intent. The current intent describes the current state of the network, e.g., software and firmware versions, switches, traffic, and the like, and the intended intent describes an intended state of the network, e.g., the state of the network the network operator desires. To achieve this intended state, changes must be applied to the network at the current state.

Each intent may be conceptualized as a node in a directed graph, with an edge directed from the current intent to the intended intent, and where each intent describes a state for the network. Each edge in the graph represents a transition from one state to another. The system determines the operations necessary to transition from the first node to the second node, and has the ability to automatically perform the necessary operations. When operations can be performed in parallel, the system may do so.

Each intent describing a state includes data describing a set of configuration settings, software versions, etc. In some implementations, this description is declarative, and the entire desired state of the node is described. The automated network change system takes these intents and determines operations to perform and the order in which the operations are to be performed. During this change process, the network may undergo multiple intermediate states. For each state, the system i) algorithmically computes the individual changes to transition from one state to another; ii) applies the changes; iii) determines if additional, context-specific safety checks need to be performed, and if so, performs them; and iv) continues to the next state until completion.

In some implementations, during step (i), the algorithmic computation of individual changes to apply may be in response to the individual network's unique conditions, such as the count of functioning switches in the network, the location of failure domains within the network (e.g., shared power sources, shared control domain, etc.), the specific models of the network switches, the risk associated with a change in a given part of the network (e.g., placement of important customer traffic, equipment of different cost to replace, equipment whose failure has a larger impact, etc.), and the software running on the switches. More or fewer factors may also be considered.

In some implementations, this algorithmic selection computation is performed according to policies such as minimizing risk, and maintaining appropriate connectivity in the network. For example, when changing from an intent where "0% of switches have new configuration A" to an intent where "2% of switches have new configuration A," the system will minimize risk by selecting switches from different failure domains, and avoiding important customers' traffic. Such risk minimization migration logic is programmed into an intent translator.

To maintain appropriate connectivity, the algorithm chooses individual changes in an order that preserves the network's connections. For example, in a change from one type of wide-area (backbone) connectivity to another, the change must be done incrementally, interleaving wide-area and local changes so the first wide-area change happens before the first local change (otherwise the first local system would lose wide-area connectivity) and so the last wide-area change happens after the last local change (otherwise the last local system would lose wide-area connectivity). Again, such risk minimization migration selection logic is programmed into the intent translator. Examples of interleaving changes are described in with reference to FIG. 5.

In some implementations, during step (ii), the system makes the algorithmically identified changes to implement the workflow's next intent. This can include automatically contacting external network management systems to make the change.

In some implementations, during step (iii), the system determines if any additional, context-specific safety checks are required by the operations it just performed. For example, a wide-area connectivity change might require wide-area-specific checks that are computationally expensive to perform, and thus should only be performed when needed. Again, such safety check logic is programmed into the intent translator.

The system can also stop automatically at any time if asynchronous, lightweight safety checks fail, or by manual activation of "Stop" function. The Stop function stops all instances of the workflow in an emergency situation. It is a global pause for work on all network types and prevents new work from starting.

In some implementations, when the system has stopped on its own due to failed safety check, it can either pause in a "safe state" (in which further network failure is prevented), or revert back to a last verified intermediate state, or automatically undo the changes.

In some implementations, the system is able to automatically undo the changes by determining the changes needed to return to the previous intent state in the workflow graph, using the same algorithm as described above by simply reversing the directions of the edges in the graph. This automatic computation of the steps to undo any change is an additional advantage and technical improvement realized by describing the overall process as an intent-based workflow.

These features and addition features are described in more detail below.

Example Operating Environment

FIG. 1 is a system diagram of an example automated network change system 100. The various elements described below are realized as data structures (e.g., intents, list of predicates, list of operations 121), an entity instantiation in either software, hardware, or a combination of both, (e.g., intent translator 121, operation runner 122, database 128), or as services. The architecture described in FIG. 1 is but one example that can be used to realize the novel features of the automated change system, and other architectures can also be used.

In this example, the system 100 includes an Automated Change System (ACS) front end 102 that includes several constituent components. The front end 102 provides, in this implementation, a remote procedure call (PRC) SetFabricState to an automation workflow 104. The automation workflow 104 provides a set of intents that describes an intended state of a switch fabric. In this example, there is an existing, or current, switch fabric, referred to as a first switch fabric (FFC) 110, and an intended switch fabric, referred to as a second switch fabric (SFC) 112. The automation workflow 104, after providing the intended state to the front end 102, waits for progress updates and indications of a final result, which may indicate a successful change from the FFC 110 to the SFC 112, or, alternatively, a failure in the change from the FFC 110 to the SFC 112.

The intended state of the SFC 112 is validated by an intent validator 126. The intent validator 126 accesses a network model database 128 that describes multiple acceptable states of a network fabric, each state which is referred to as a "snapshot." Each snapshot describes a set of configurations for the fabric, or a portion of the fabric, and each snapshot differs from each other snapshot. Each snapshot may be pregenerated prior to the migration. For example, network operators may determine that there are several intermediate states to achieve during a migration, and each state may be described by a model snapshot. To validate the set of intents, the intent validator 126 checks whether the network elements (switches, etc.) described by the intents matching the various model snapshots. This is done to ensure that the intent describes an intended state that can actually be realized using the model snapshots.

If the set of intents is not validated, the network operator is notified of the invalid set. Otherwise, the intent translator 120 receives the set of intents, and then compares the intended state of the SFC 112 to the current state of the FFC 110. The intent translator 120 then computes a set of network operations 121 to perform on the FFC 110 to achieve the SFC 112. The set of operations also define an order in which the operations are to be executed. The intent translator 120 determines the set of operations based on a set of first intents that describe the FFC 110, the set of intents received by the intent validator 126, also referred to as second intents, and migration logic that defines a ruleset for selecting the operations based on the set of first intents and the second intents. The migration logic is described in more detail below.

The list of network operations 121 are provided to an operation runner 122. The operation runner 122 dispatches each operation according to the order (either serially or in parallel when possible) to corresponding backend services and servers, e.g., mediation server 106, migration agent 107, and verification 108, based on the operation type.

For example, Drain/Undrain operations, Config Push, Reboot, and Flow Cleaning operations are handled by a mediation server 106, while flow programming will be handled by the migration agent service 107, both of which are described in more detail below. The operation runner 122 has a list of backend managers that enable interaction with each service, building and maintain connection, building request structures, sending the request, processing queries, etc., through backend service managers 131. The drain operation is an operation that "de-prefers," or deprefs, an element to remove traffic from the element. Conversely, the undrain operation enables traffic for the element. A config push operation pushes a configuration, e.g., a software or firmware change, to an element for the element to be updated by the change. A reboot operation reboots an element. The flow cleaning operation deletes programming rules in the fabric that have been rendered obsolete due to the change. These are just an example set of operations that can be generated by the intent translator 120, and other appropriate operations can also be used.

The intent translator 120 also generates a list of predicates 125 that the verification runner 124 uses to verify that the fabric state have converged to the intended state (or a specified intermediate state during a transition from the FFC 110 to the SFC 112). The predicates 125 each describe conditions subsequent to a change that are to be verified by the verification runner 124. For example, if a configuration change to a switch changes a maximum size of a routing table, the maximum size is verified according to a predicate. These runners run in a continuous manner to make sure the fabric stays in the intended state. The evaluation result is reported back to the workflow 104 through a monitoring service 130. The processing operations 121 and predicates 125 are described in more detail below.

During migration from the FFC 110 to the SFC 112, the ACS front end 102 relies on the list of network model snapshots in a model database to gradually convert each component from the FFC control to the SFC control. During the migration, the ACS front end 102, using the intent translator 120, selects model snapshots to use in to configure the fabric entities. The intent translator 120 determines the correct model snapshot label based on the migration context, and then the model data can be loaded in our mediation server's 106 model directory for usage.

In some implementations, the mediation server 106 an asynchronous network automation service, and provides RPC interfaces to a number of network operations such as configpush, drain, undrain, reboot, and flow cleaning. Each of these mediation server 106 services has its own request and response definitions, as well as operation parameters. When a request can normally take multiple network entities, they can be executed in parallel when possible. In some implementations, the mediation server 106 has a shared job management service. Each request will be assigned with a unique job identifier that can be queried for job status. Accordingly, the operation runner 122 causes the operations 121 to be executed by dispatching the operations according to the order to the mediation server 106. The mediation server 106 then provide the service that manages the changes implemented on the FFC 110, SFC 112 and switches 114.

The RPC interface, RPCSetFabricState, in some implementations, realizes several design principles. A first principle is to enable the workflow 104 to use a minimum set of states to control the fabric, which, in turn, simplifies expression of the intended fabric state. This is accomplished, in part, by use of the model snapshots in the network model database 128. Instead of the workflow 104 specifying all possible states, the front end 102 need only receive the states describe by intents, and can then, by use of model snapshots and migration logic, determine operations and intermediate states required to achieve the intended state.

Another design principle is flexibility to adjust, add or remove migration steps. The front end 102 operations are not bound to a particular migration step, but instead are determined based on a migration context, and can be implemented in a stateless manner. Thus, the workflow 104 can add new intents at any time, and the intents will be accepted provided they are validated by the validator 126.

Intents

Figure 2:
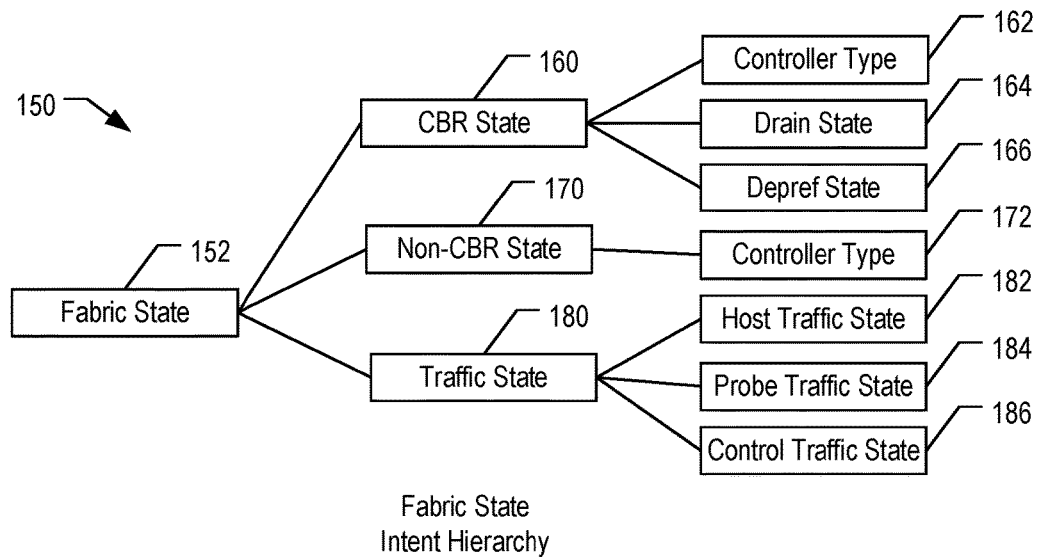
FIG. 2 is a block diagram of an example fabric state intent hierarchy.

FIG. 2 is a block diagram of an example fabric state intent hierarchy 150. In this example, the fabric state 152 of a fabric (either FFC 110 or SFC 112) is described by three logical entity states: cluster border router (CBR) state 160, non-CBR state 170, and traffic state 180. The routers are grouped by cluster border routers, which connect the fabric to a wide area network separate from the fabric, and non-cluster border routers, which are within the fabric but do not connect the fabric to the wide area network. These intents are used for migrating the switches and routers and migrating traffic. Although many states of other type of entities, e.g., control domains, ports, applications, etc., are required to change during each migration step, the intent translator 120, by use of the snapshots and migration logic, determines the changes without the network operator being required to determine and schedule these operations.

The CBR state 160 describes the state of the CBRs in the fabric. In some implementations, the state of each switch is described by a controller type 162, a drain state 164, and a depref state 166. The controller type specifies which controller type (FFC 110, SFC 112, or proxy 116) the switch is to connect to. The drain state 164 indicates whether the switch is drained or undrained. Finally, the depref state 166 specifies whether the switch is de-preferred. For non-CBR switches, a non-CBR state 170 intent is used. Here, the only the controller type 172 is specified. Finally, for the traffic state 180, the state of traffic is described by host traffic state 182, probe traffic state 184, and control traffic state 184, each of which are described in more detail below.

Non-CBR Switches

For non-CBR switches, the intent translator 120 specifies which open flow controller (OFE, or software defined network (SDN) controller) each OFE server should connect to during the migration. Connections are managed, in part, by an OFC/switch controller proxy 116 that can simultaneously control the non-CBRs according to controller logic of the first switch fabric 110 and controller logic of the second switch fabric 112. The switch controller proxy 116 is seen by each switch as a single controller, when, in fact, the switch may be controlled according to logic of both fabrics 110 and 112. Such dual control is required during the migration for error checking and interleaving migration of traffic from the FFC 110 to the SFC 112. By use of the controller proxy 116, a switch may be simultaneously controlled by both the FFC 110 and the FFC 112.

Based on the controller type of each chassis, the front end 102 determines, by use of snapshots and migration logic, which switches or control domains require a configuration update (config push), which model snapshot to use for the configuration update, and whether flow cleaning is needed for a transition. (e.g., when switching from the proxy controller 116 to FFC 110 or SFC 112 control). In some implementations, the OFE connectivity is controlled at the granularity of each chassis, and the workflow 104 has the flexibility to control when to migrate each switch. The determination is made based on feedback from the monitoring service 130 and progress updates from the intent translator 129.

CBR Switches

In some implementations, CBR switches are migrated according to blocks. For example, the CBR switches may be divided into N blocks, with one block being migrated from the FFC 110 to the SFC 112 at a time. In some implementations, N is 4, and the system migrates each of the 4 CBR blocks one at a time. To migrate a CBR block, the following operations are, as defined by the migration logic implemented in the intent translator 120:

1. Drain the CBR block.
2. Place the CBR block in a border gateway protocol (BGP) de-preferred state in SFC 112 domain. This precludes sending of traffic to the CBR block before paths can be probed.
3. Switch the CBR switches in the block to SFC 112 control.
4. Undrain the CBR switches.
5. Probe the path to confirm routing and remove the de-preferred state.

To accomplish the above, the front end 102 and the workflow 104 control the following states in each migration step: which fabric controller to connect to, FFC 110 or SFC 112; the draining or undraining of each chassis; and placing the CBR block in either a de-preferred or normal state.

In some implementations, the CBRs are only migrated in the granularity of block. While each CBR block is an FFC 110 domain, each CBR block may result in multiple SFC 112 domains after the migration. Accordingly, a common entity to both domains is used to express the intent. The entity can be either a physical chassis (switching devices mounted to a particular backplane for a physical chassis) or a virtual chassis (switches that are communicatively connected by other means for a virtual chassis).

With this information, and using the migration logic described above, the front end 102 can determine the following:

1. The mapping between FFC domains and SFC domains.
2. Which CBR chassis and CBR control domains to push configurations to.
3. Which model snapshot to use.
4. Which CBR chassis to drain or undrain.
5. Perform path verification and decide whether to remove de-preferred state.
6. The order to perform the operations 1-5 immediately above.

Note a CBR block has corresponding spine block links, which are switches that connect CBR blocks to facilitate traffic between the CBR blocks. Accordingly, when a CBR block is drained, the corresponding spine-CBR links also need to be drained in order to avoid sending traffic from the spine block link to the CBR block.

Traffic State

The traffic state is used by the workflow 104 to migrate different types of traffic from the FFC 110 to the SFC 112 during a roll forward, or to migrate from SFC 112 to the FFC 110 during a roll back. The fabrics have two types of traffic control intents—host traffic control and control traffic control. Using these intents, the workflow 104 can define when to migrate traffic, which type of traffic to migrate, and in which granularity the traffic will be migrated. The traffic can be migrated to the granularity of a chassis, such as by matching type of service (ToS) values.

In some implementations, the front end 102 can also use a packet with a particular ToS value to probe paths. This is defined in the probe traffic state 184 intent. By use of this intent, the front end 102 can allow the workflow 140 to specify which fabric to probe, FFC 110 or SFC 112, by placing probe flows on the top of rack (ToR) switches. Based on this information, the front end 104 determines which type of flow rules to install on which switches, and which SFC 112 control domain to send the flow install request.

The fabric state 152 intent may also have additional data, such as a fabric name, a position in the migration workflow (e.g., start, end, or an intermediate state S1, S2, etc.), and the drain state of each chassis and port. Other information may also be used.

In addition to the front end 102 being able to determine implicit states and operations from a specified state, the front end 102, in some implementations, can also implement semantic relation to correlate the states of different entities and decide the operation order and reject harmful transitions. For example, in a canary step, which is described in more detail below, the workflow 104 may attempt to connect a few ToRs to the switch controller proxy 116, and then have probe traffic running on them to verify the connectivity. Given this intended state, the front end 102, by use of the migration logic, determines that the probing flows can only be installed after the ToRs are connected with switch controller proxy 116, and thus determines that all config push operation to affected ToRs happens first. Likewise, for roll back, in which the front end determines to disable the probe traffic and move the ToR back to the FFC 110, the operation order is reversed.

Network Operation and Verification Models

To properly implement the migration, the front end 102 the central control of live migration, the front end 102 needs to coordinate a large set of backend tasks, e.g., config push, drain/undrain, program or clean flows, verifying various states of the fabric. This is accomplished by a simple interface to manage backend tasks, and is shown in more detail in FIG. 3, which is a system flow diagram of operation of the intent translator 120.

Figure 3:
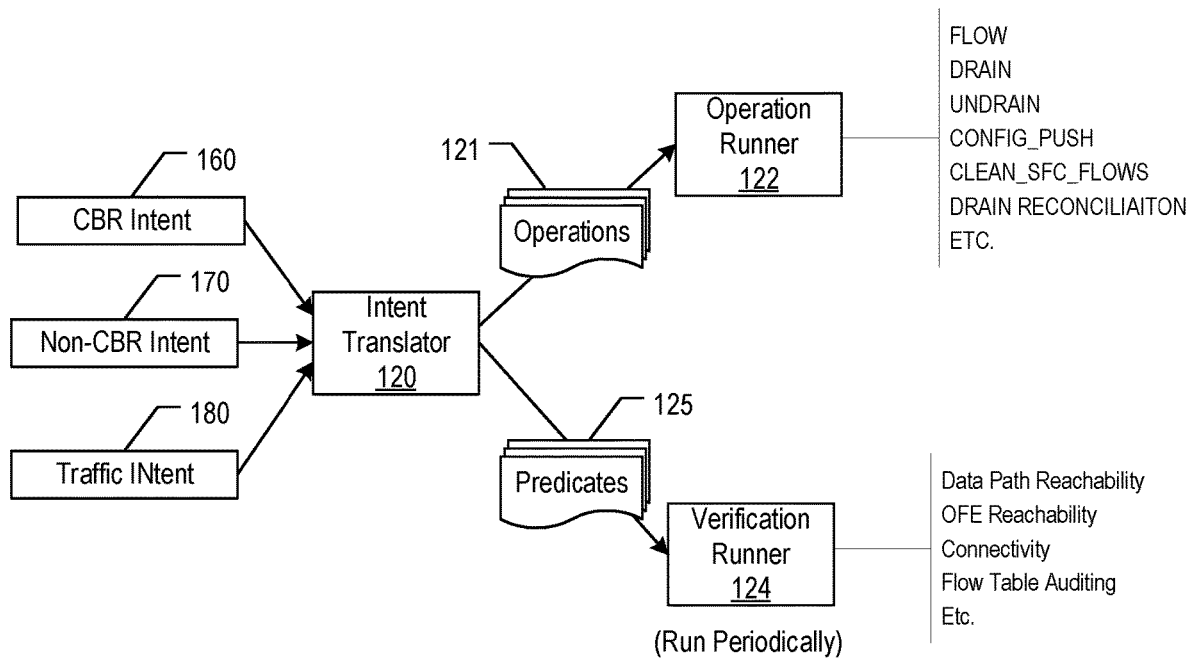
FIG. 3 is a system flow diagram of operation of the intent translator.

The front end 102 achieves this goal by defining two unified interfaces, one for operations 121 and one for verifications by predicates 124. As shown in FIG. 3 and as described above, fabric intents are translated into an ordered set of operations 121 and another ordered set of verification tasks as defined by predicate 125. These unified tasks can be executed by a single runner interface in any predefined order, regardless of what kinds tasks they are.

Operations are defined by a corresponding data structure that includes fields for data that specify:

Operation_Type: The type of operation to perform, can be FLOW_PROGRAM, CONFIG_PUSH, DRAIN, UNDRAIN, controller_DEMOTE, controller_PROMOTE, REBOOT, etc.

Model_Label: The name of the model snapshot to use for the operation.

Network_Entites: The set of entities to apply the operation. Each entity can either be an Chassis Id, Port Id, or Control Domain Name. Other entities can also be specified as needed.

Traffic_State: This field expresses the intended traffic state (i.e. control traffic, host traffic, or probe traffic) for each chassis.

bool reconcile_drain: This field indicates whether to reconcile the drain/undrain status for DRAIN/UNDRAIN operations.

after_operation_wait_time: This field indicates that an extra delay should be added before the start of next operation, after an operation has completed. That is designed for letting the system state converge after certain operations, like controller demote/promote.

Operations can be executed in a batch mode or sequential mode. In batched mode, all the affected chassis are specified in a single mediation server 106 request. Conversely, in a sequential request, only one chassis is specified per mediation server 106 request. Yet another option is to specify multiple chassis at a time, with a maximum number as a configurable parameter.

Operation process can be reported using an operation state intent. The intent includes fields specifying the following:

NetworkEntity entity: The network entity affected by the operation.

State state: Describes the state of the operation. Can either be IN_PROGRESS, COMPLETE, or FAILED.

Status: A status to describe the failure if there is any.

Operation_Type: the type of the operation.

The intent translator 120 also implements logic to prevent invalid or harmful transitions to avoid damage to the fabric, and to return errors for invalid intents. For example, an intended intent that specifies a configuration for a switch that is incompatible with the FFC 112 would cause the intent validator 126 to return an error. The intent validator 126 utilizes a rule set defining compatibilities and other validation rules to validate intents.

As described above, the intent translator 120 has built-in knowledge about the migration procedure by use of its migration logic and mode database 128. Accordingly, given the current state of the fabric and an intended state, the intent translator 120 determines which operations it must specify to the operation runner 122. In addition to these explicit operations 121, the front end 102 can also specify operations not required or defined in the fabric intent. These operations are referred to as implicit operations, and are determined from the migration context.

The intent translator 102 also prevents certain operations based on the context and migration logic. For example, if non-CBR switches are under FFC 110 control, then it will be dangerous to move any traffic to SFC 112 control, because there will be no viable routes for the traffic. Thus, the front end 102 will reject such operations.

Figure 4:
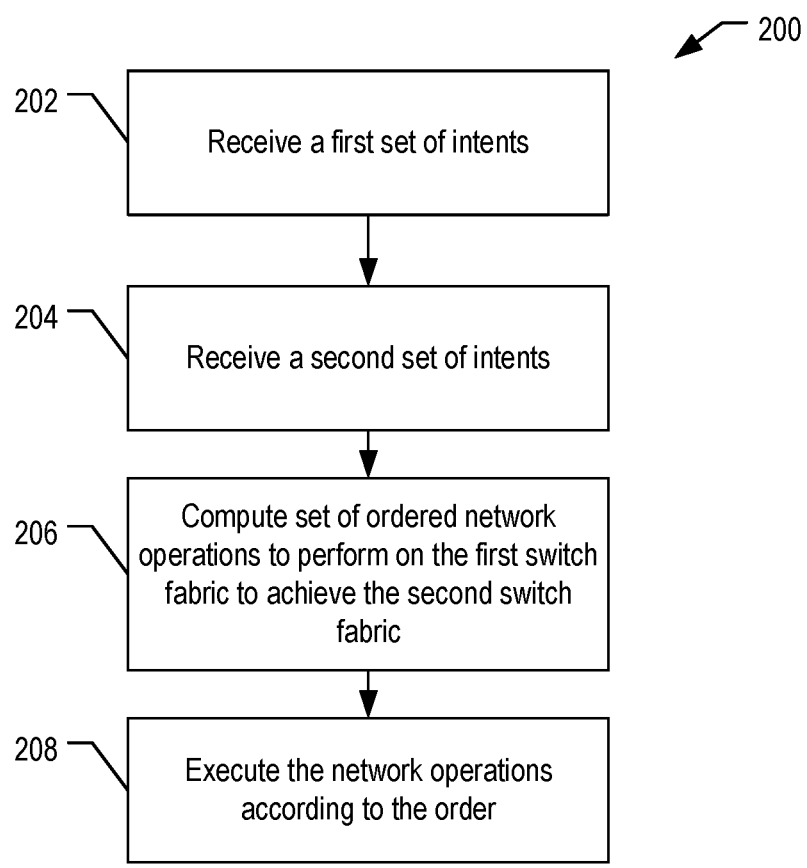
FIG. 4 is a flow diagram of an example process for automatically changing a network system according to intents and an intent translator.

FIG. 4 is a flow diagram of an example process 200 for automatically changing a network system according to intents and an intent translator 102. The process is performed by one or more computers in data communication, and executing the intent translator 102 and other system components.

The process 200 receives a first set of intents (202). The first set of intents describes a state of the first switch fabric 110. This can be a current state.

The process 200 receives a second set of intents (204). The first set of intents describes a state of the second switch fabric 112. This can be an intended state.

The process 200 computes set of ordered network operations to perform on the first switch fabric to achieve the second switch fabric (206). The set of operations also define an order in which the operations are to be executed. The intent translator 120 determines the set of operations based on the set of first intents, the set of second intents, and migration logic that defines a ruleset for selecting the operations based on the set of first intents and the second intents.

The process 200 executes the network operations according to the order (208). The operations performed and the order in which they are performed may vary depending on the current state of the migration, what elements are being affected, and whether the front end 102 is performing a roll forward or roll back. FIGS. 5-10 are example flows for migration steps, and FIG. 5 in particular is a high level flow diagram 200 of migration steps that occur during a change of an example network.

Figure 5:
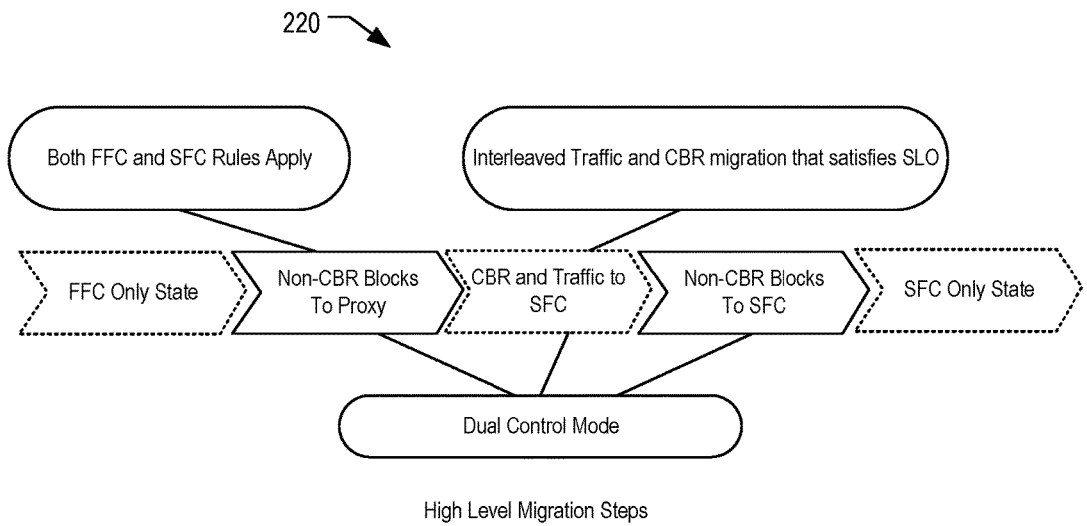
FIG. 5 is a high level flow diagram of migration steps that occur during a change of an example network.

In FIG. 5, the migration is from the current state of FFC 110 to an intended state of FFC 112. From the FFC only state, the non-CBR blocks are moved to dual control to be controlled by the controller proxy 116. Here non-CBR switches will be connected with both FFC 110 and SFC 112, i.e., flow rules will co-exist on the switches. This is to prepare for migrating CBRs and traffic to the SFC 112. Both FFC 110 and SFC 112 rules may apply.

The CBR blocks and traffic will be incrementally migrated to SFC 112 according to an interleaving process that migrates proper subsets of CBRs from the FFC 110 to the SFC 112. The first blocks of CBRs that are migrated provide a viable SFC 112 path in the fabric. Then portions of the traffic are migrated to the SFC 112. In this interleaved way, the front end 102 migrates the rest of the traffic and remaining CBR blocks to SFC 112. After all non-CBR blocks are migrated to the SFC 112, the fabric is under SFC 112 control only. Each of these steps involves multiple steps and large amount of operations, which are described in more detail below.

During the migration, non-CBR switches will be connected with controller proxy 116 (dual control mode), to prepare the fabric for CBR and traffic migration. After CBR and traffic has been migrated from FFC 110 to SFC 112, non-CBR switches will be taken to the SFC 112 only state. From the non-CBR intent, the workflow 104 specifies the controller each chassis should connect to. The intent translator 120 identifies differences between the current controller type and the intended controller type, and based on the differences, determines which of the chassis needs a configuration update. The intent translator 120 also summarizes controller states of all the chassis to determine which migration stage each chassis is at.

Figure 6:
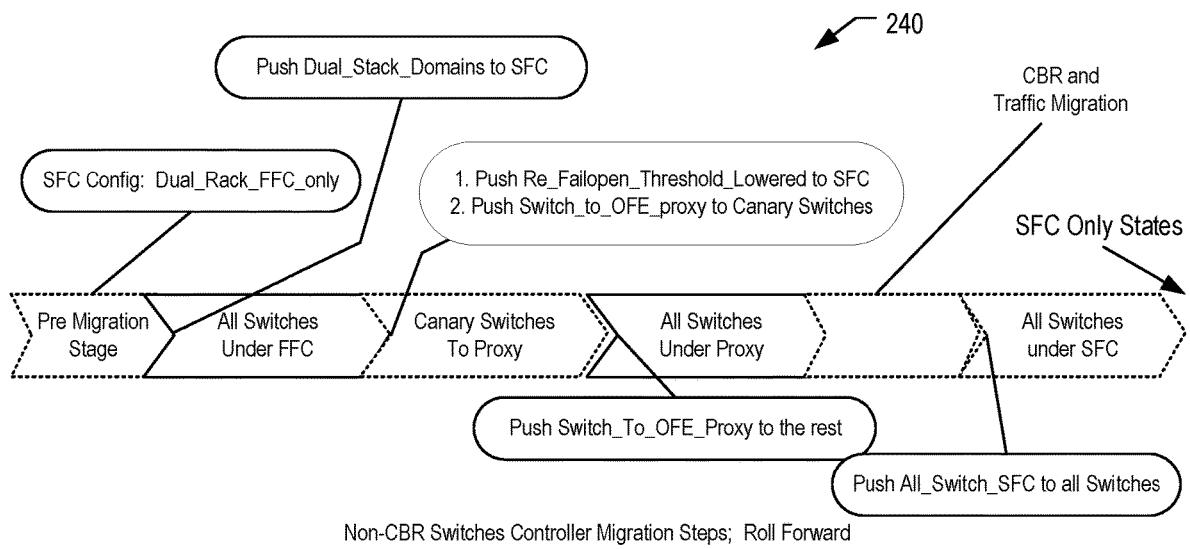
FIG. 6 is flow diagram of a roll forward change process for non-cluster border router switches.

FIG. 6 is flow diagram of a roll forward change process 240 for non-cluster border router switches. The premigration stage is not determined from non-CBR intent translation. In this stage, the fabric is prepared with a SFC rack installed, but no chassis is present in SFC configuration, e.g., the second controller for the SFC 112 is set up, but no element are in its network at this time.

Thereafter, all non-CBR switches are moved to dual control. The switches are controlled by FFC 110, but they are also present in SFC 112 and controller proxy 112 (which is disconnected) to prepare for dual control mode. A configuration to move a rack to a dual stack domain is pushed to all SFC 112 non-CBR control domains.

Canary switches (which are a subset of switches that have been changed by the ACS system and are used to test for stability and operational performance) are connected to the controller proxy 116. The process of canary checks is described in more detail in the "Canary Checks" section below. During this stage, some switches are moved to dual control mode as a canary step. The list of switches used for canary are computed from the difference determined between the fabric states. The number of switches connected with SFC 112 should be higher than a threshold, otherwise the SFC 112 may go to a fail open state. To avoid this situation, a fail open threshold is lowered by pushing a RE_FAILOPEN_THRESHOLD_LOWERED model to the non-CBR SFC 112 control domain to lower the fail open threshold before the switches are connected to the controller proxy 116. The selected canary switches are then connected to the controller proxy 116 by pushing an appropriate configuration.

Provided the canary check passes, then all switches are connected to the controller proxy 116. Thereafter, the non-CBR part of the fabric is under dual control, and the workflow 104 starts to migrate CBR blocks as well as traffic in an incremental way.

After traffic has been migrated, all the switches are then connected to the SFC 112 and disconnected from the controller proxy 116. Finally, when all switches are under SFC 112 control, the migration is complete.

Figure 7:
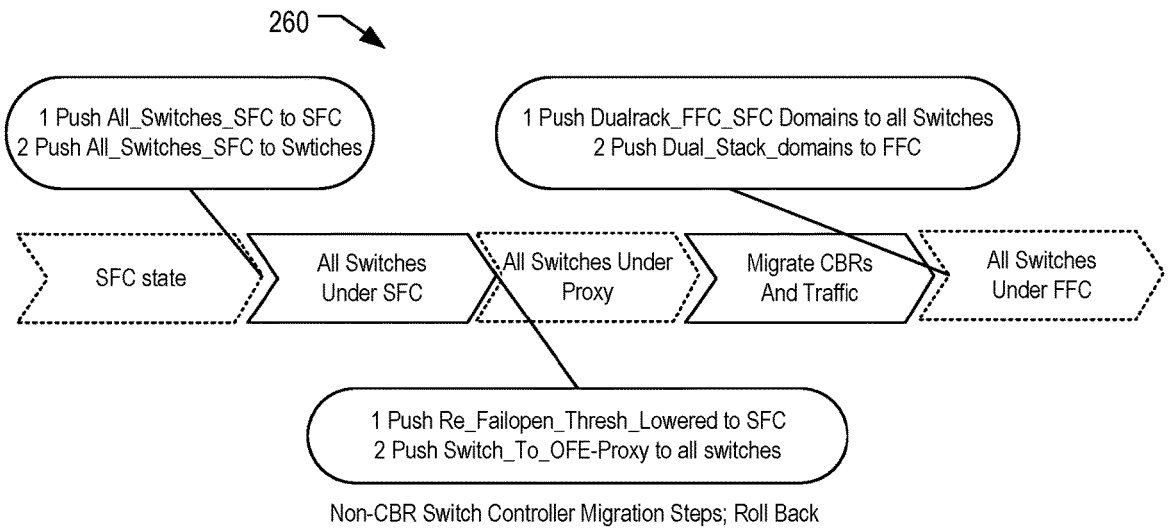
FIG. 7 is a flow diagram of a roll back change process for non-cluster border router switches.

FIG. 7 is a flow diagram of a roll back change process 260 for non-cluster border router switches. A rollback procedure roughly goes through the same set of states in reverse direction to gradually restore FFC 110 control. A minor difference is that some canary steps can be omitted. Initially, in the SFC state, the fabric is purely controlled by the SFC 112.

All switches are moved to dual control of the controller proxy 116. At this stage, all the switches are connected with SFC and the non-CBR part of fabric is under dual control. When all switches are under the controller proxy 116, the system is in a state to prepare for the CBR and traffic migration to the FFC 110. Again, the fail open threshold may be lowered during this time. Then the CBRs and traffic are migrated back to the FFC 110. Thereafter, all non-CBR switches are moved back to FFC 110.

With the above migration steps, the front end 102 can determine whether a transition is allowed at each stage. For example, if a chassis is going from FFC 110 directly to SFC 112, without dual control, there is no time to convert CBRs and traffic. Accordingly, such a transition may be precluded based on a rule. Likewise, if any traffic is still on the FFC 110, or if a CBR block is still under the FFC 110, the system will not convert a non-CBR block to the SFC. Again, this preclusion can be effected by a rule. Similar checks can be implemented on a roll back. The same set of checks is happening in both roll forward and rollback directions.

In some implementations, CBR block conversion starts when all non-CBR switches are under the controller proxy. The CBR state is described by three features: controller state, drain state, and depref state. According to these states, only the following transitions as described in FIGS. 8 and 9 are allowed.

Figure 8:
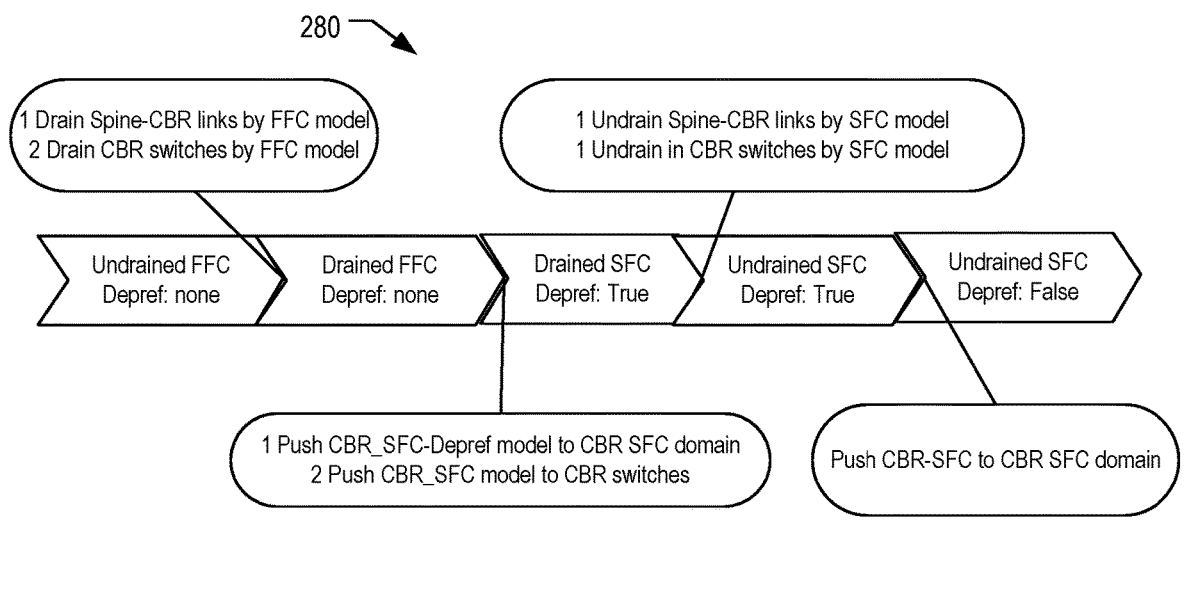
FIG. 8 is flow diagram of a roll forward change process for cluster border router switches.
Figure 9:
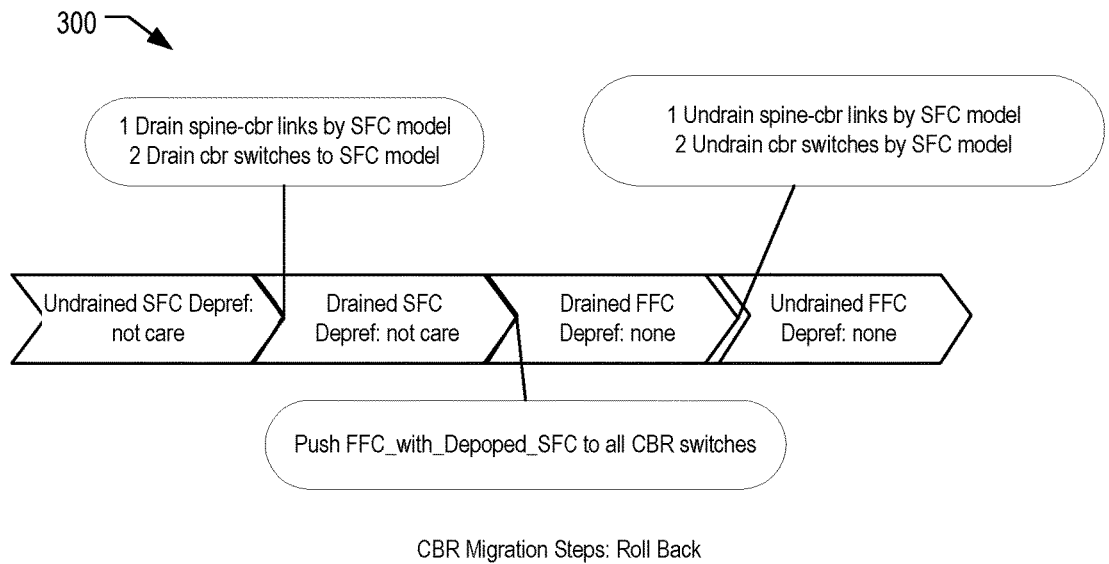
FIG. 9 is a flow diagram of a roll back change process for cluster border router switches.

FIG. 8 is flow diagram of a roll forward change process 180 for cluster border router switches. Initially the CBR is undrained and controlled by the FFC 110. The front end 102 drains the CBR chassis. In some implementations, the front end 102 also drains spine-CBR links before draining the CBR chassis, to avoid traffic loss in northbound (spine to CBR direction). Southbound traffic (CBR to spine) will prefer other CBR domains.

SFC 112 configurations are then pushed to the CBR chassis to move the CBR chassis to the SFC 112 control. The front end 102 may also first push a depref configuration to the corresponding SFC control domain, such that this domain will be depreferred by traffic. The switches are now drained under SFC 112, and depreferred. Through this, the CBR path in SFC can be probed before routing traffic to it.

The CBRs are then undrained under the SFC 112. The front end 102 undrains spine-CBR links before undraining the CBR chassis. At this point, the CBR domain is still depreferred, and thus no traffic will be running on the chassis. The path in SFC can then be probed since they are undrained and in the depreferred state. In some implementations, the front end 102 only allows undraining if the SFC domain is in depreferred state.

Once the path is confirmed to be working by the probe traffic, the depreferred state is removed from the SFC 112. Thereafter, traffic will begin flowing in the CBR under SFC control.

FIG. 9 is a flow diagram of a roll back change process 300 for cluster border router switches. CBR domain rollback is slightly different for roll back steps in that the FFC need not have depreferred state at any time. Accordingly, probing of the path is not performed before putting traffic back on the FFC 110. Accordingly, the probe step may be skipped.

Initially the CBR is undrained and controlled by the FFC 112. The front end 102 drains spine-CBR links first, and then drains CBR chassis. This transition is not affected by the current depreferred state in SFC 112 domain. The front end 102 then pushes a FFC 110 configuration to the CBR chassis, and the CBR switch is then moved back to FFC 110 control. The CBR chassis is then undrained, and traffic begins to flow under the FFC 110.

The intent translator 120 is programmed to preclude certain scenarios during the CBR state transition. These include transitioning any chassis from FFC 110 to SFC 112 or from SFC 112 to FFC 110 without draining; migrating only half of an FFC 110 CBR domain; transitioning to an undrained state under SFC 112 control without depreferred state; and changing drain state and controller state at the same time.

Traffic migration happens in multiple stages. In some implementations, the amount of traffic to migrate to the SFC 112 is controlled by workflow 104 on a per-ToR basis. Host traffic migration happens after at least one CBR domain is under SFC 112 control. However, as long as the fabric still has non-CBR switches connected with the proxy controller 116, the workflow 106 can request to install probe flow rules on ToRs to start probing SFC paths.

Similar for control traffic, the front end 102 gives flexibility to the workflow 104 to migrate at per-ToR basis. Additionally, traffic intent operations are performed through a backend service called migration agent 107. The migration agent 107 can install certain types of flows on ToR nodes to migrate probe/host/control traffic.

In some implementations, the migration agent 107 can only install flows on the nodes when the node are connected with SFC 112 or the proxy controller 116. In these situations, the following conditions apply. When both a configuration push and a traffic operation happen on the same switch, they may need to be executed in a particular order. For example, when an intent requires connecting a ToR to the controller proxy 116, the intent might also require installing a probe flow rule on the ToR. In this case, the configuration push happens before flow installation. But if intent requires to move the ToR from controller proxy 116 to the FFC 112 and remove the probe flow rule, the flow removal happens before configuration push. Finally, if any switch is not connected with SFC 110 or the controller proxy 116, no flow operations can be done.

Figure 10:
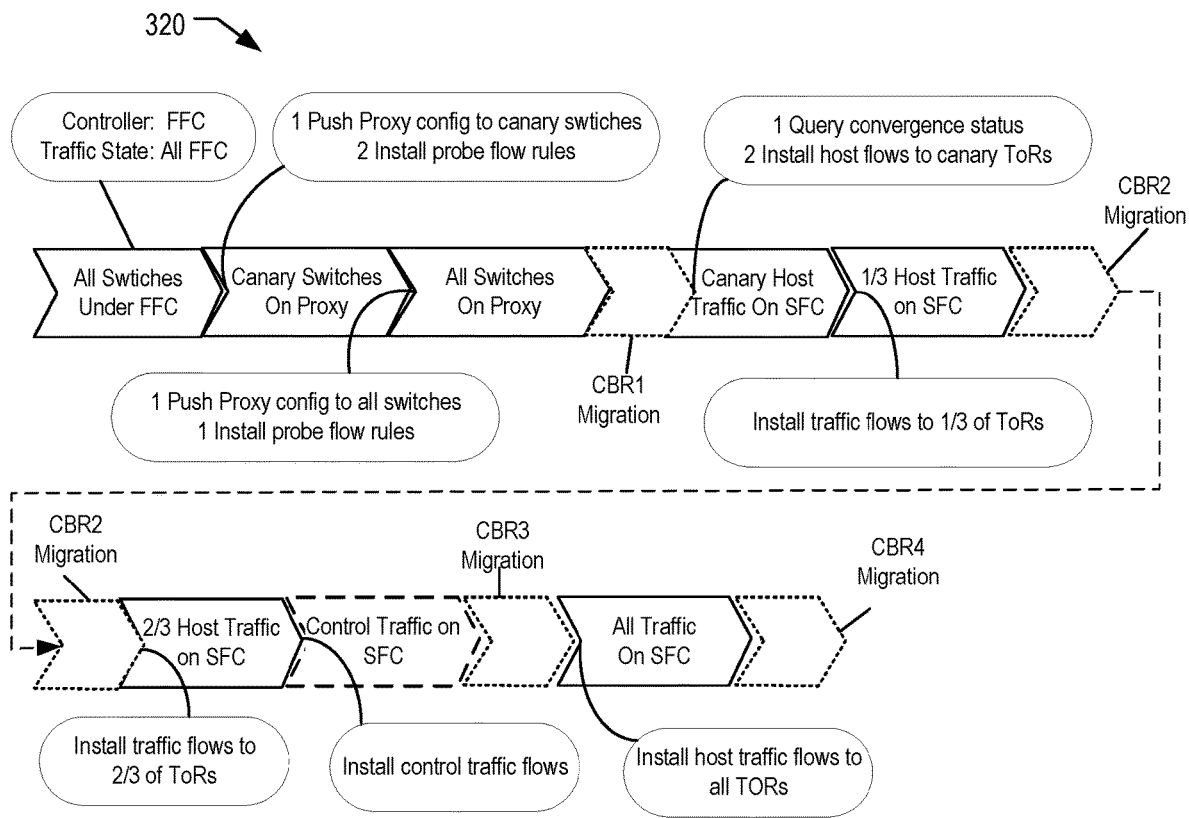
FIG. 10 is a flow diagram of a roll forward change process for traffic migration.

FIG. 10 is a flow diagram of a roll forward change process 320 for traffic migration. The migration agent 107 expresses which traffic needs to be on SFC 110 VRF and which needs to be on FFC 112 VRF.

Initially all switches are under the FFC 110. A proxy configuration is pushed to canary switches, and probe flow rules are then installed. Provided the canary switches pass, the proxy configuration is then pushed to all the switches so they are on the controller proxy 116, and probe flow rules are installed. CBR switches are then migrated by blocks. For each migration, a canary is processed, and provided the canary results in success, a portion of traffic flows is migrated. This process repeats until all CBR blocks and traffic are migrated. Roll back can be done in a reversed manner.

Canary Checks

As described above, there are a number of transitions that are checked for failures ("canarying") during the automated network change migration process. Below is a description of these transitions and the criteria for success. Other appropriate criteria can also be used.

When connecting the switches to a front end of the controller proxy 116, the following conditions must be met to be successful: i) the configuration push must be successful; ii) once enough switches are connected to the SFC 112 to form a connected topology, routing should converge (e.g., no loops, drops, etc.); iii) no programming errors are present on the connected switches; and iv) the switch remains stable and does not crash.

When migrating data traffic to the SFC 112 Virtual Rounding and Forwarding (VRFs), the following conditions must be met to be successful: i) resources (machines) under migrated ToRs should be able to reach each other; and ii) resources under migrated ToRs should be able to reach unmigrated TORs (and vice versa).

When migrating inband traffic to the SFC 112 VRF, the following conditions must be met to be successful: i) migrated ToRs should be able to retain reachability to the FFC 110, SFC 112 and the controller proxy 116; and ii) trace routing continues to work from both migrated and unmigrated ToRs as well as fabrics switches that are connected to controller proxy 116 under dual control.

When connecting the switches to second fabric controller, the following conditions must be met to be successful: i) the configuration push must be successful; ii) the switches should be able to reach the SFC 112 directly; iii) no programming errors are present on the connected switches; and iv) the switch remains stable and does not crash.

To build a canary subset of hosts, one or more of the following strategies can be used. A first strategy is to construct a canary that spans every superblock of switches and over which a routing engine system can route traffic from every superblock to another superblock. To construct this canary, the system selects an entire spine block, which is a set of switches that connects superblocks, as well as one undrained block from every superblock. The system an arbitrary subset of ToRs to test.

A second strategy is to construct a canary that selects ToRs situated on the same failure domain, i.e., each task has replicas on other failure domains, losing this set of ToRs should be tolerable. An example failure domain is a busbar.

A third strategy is to construct a canary that selects a small percentage of ToRs round-robin across superblocks. This strategy does not protect the individual tasks; however it allows for testing the routing from/to end hosts in every superblock.

A fourth strategy is to construct a canary that avoids potential of affecting any machines used by cloud services of customers.

The strategies may be combined for certain transitions to conduct canary testing in multiple stages. For example, when connecting switches to the controller proxy 116, a first canary using the first and second strategies verifies the correct configuration of the controller proxy 116, the switch programming, and stack health. Then a second canary using the first and third strategies may be used to verify that the proxy configuration is correct in every superblock domain.

For migrating data traffic to SFC 112 VRFs, a first canary may employ the second strategy, and then a second canary may using the third strategy may be used. For migrating inband traffic to the SFC 112 VRFs, a first canary may employ the second strategy, and then a second canary may using the third strategy may be used. For connecting the switches to SFC 112, a first canary using the first and second strategies may be used, followed by a second canary using the first and third strategies.

Failover Management

During a migration, a failure may occur. For example, the front end 102 may fail due to a software bug, preemption, and the like. Accordingly, the front end 102 provides a robust failover mechanism to limit the damage to the fabric and disruption to migration process. In some implementations, the front end is designed such that if a failure occurs after an operation has finished, but before a new request comes in, the workflow 104 can continue with any new request after failure. Conversely, if the front end 102 fails in the middle of a request, the workflow 104 may i) resume the last request after the frontend 104 failover, without having to determine the actual fabric state; or ii) rollback to the last "verified state", i.e., the last fabric intent that has been applied, and has been verified by live verification.

To achieve this, the front end 102 has two states, a verified state and an in progress state. The verified state occurs when the fabric intent that has been applied and verified by the verification runner. The in progress state is the fabric intent that is under processing. Because the front end 102 is a stateless design, everything the front end 102 does is determined by the current fabric state and the fabric intent. Accordingly, in the event of a failover, the state of the fabric intent is determinative of remedial action.

Figure 11:
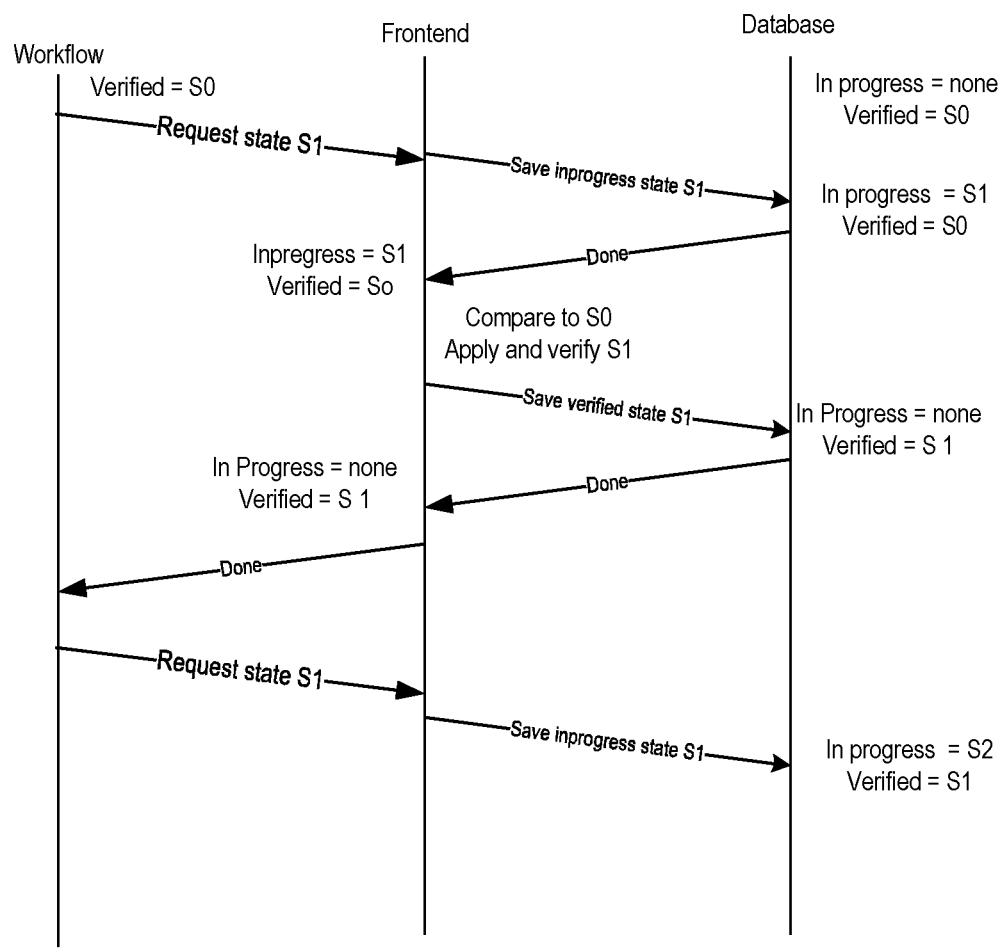
FIG. 11 is a timing diagram illustrating state management during operation execution.

FIG. 11 is a timing diagram 400 illustrating state management during operation execution. The timing diagram illustrates the actions between the workflow 104, the front end 102, and a front end database. In FIG. 11, the timing diagram is for a successful migration from a verified state S0 to a verified state S1, and ending with an in progress state of S2.

The front end 102 uses a database to store states. In operation, the front end 102 stores a new fabric intent to "inprogress state" immediately before it is processed, and saves a fabric intent of "verified state" immediately after the intent is verified by verification runner 124, and clears the "inprogress state." In some implementations, the save and clear operation are combined as an atomic operation. The front end 102 use a database to store the rules because it provides read consistency guarantee and automatic multi-site replication and failover.

There are two possible failure scenarios. A first scenario is when the front end 102 fails after the last fabric intent had completed processing, and before the next fabric intent comes in. In this case, the fabric is in a deterministic state, matching the last fabric intent. The front end 102 should restore the last fabric intent (or the "verified state"), and allow workflow 104 to continue to program the next fabric intent. There is no "inprogress state" in this case.

Figure 12:
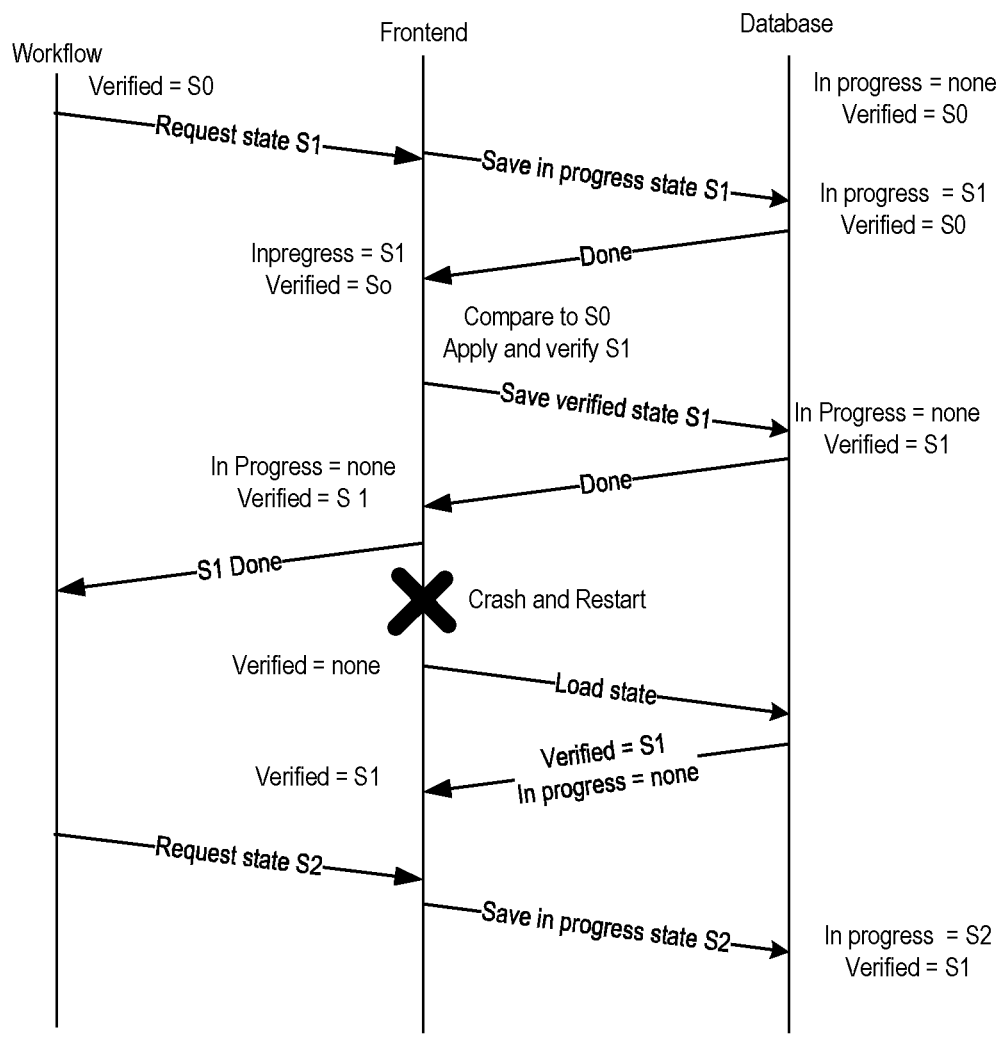
FIG. 12 is a timing diagram illustrating failover management in response to a failover between requests.

This is illustrated in FIG. 12, which is a timing diagram illustrating failover management in response to a failover between requests. After this failure, there will be only a "verified state" in a database, and no "inprogress" state. Accordingly, the fabric must be in "verified state S1". After loading the states after recovery, the front end 102 determines that it can safely continue the migration and accept the next fabric intent S2.

A second scenario is when the front end 102 fails when a fabric intent is being processed. Since many migration operations are asynchronous in nature, it may be difficult or impossible to determine whether the tasks launched before the failure were successful. Thus, the fabric is in an undetermined state. Thus, the fabric state is in the middle of the last successfully processed intent (i.e. "verified state"), and the failed fabric intent (i.e. the "inprogress state"). In this case, the front end 102 can restore both states, and let the work flow 104 to decide whether to re-apply the inprogress state, or rollback to the "verified state".

Figure 13:
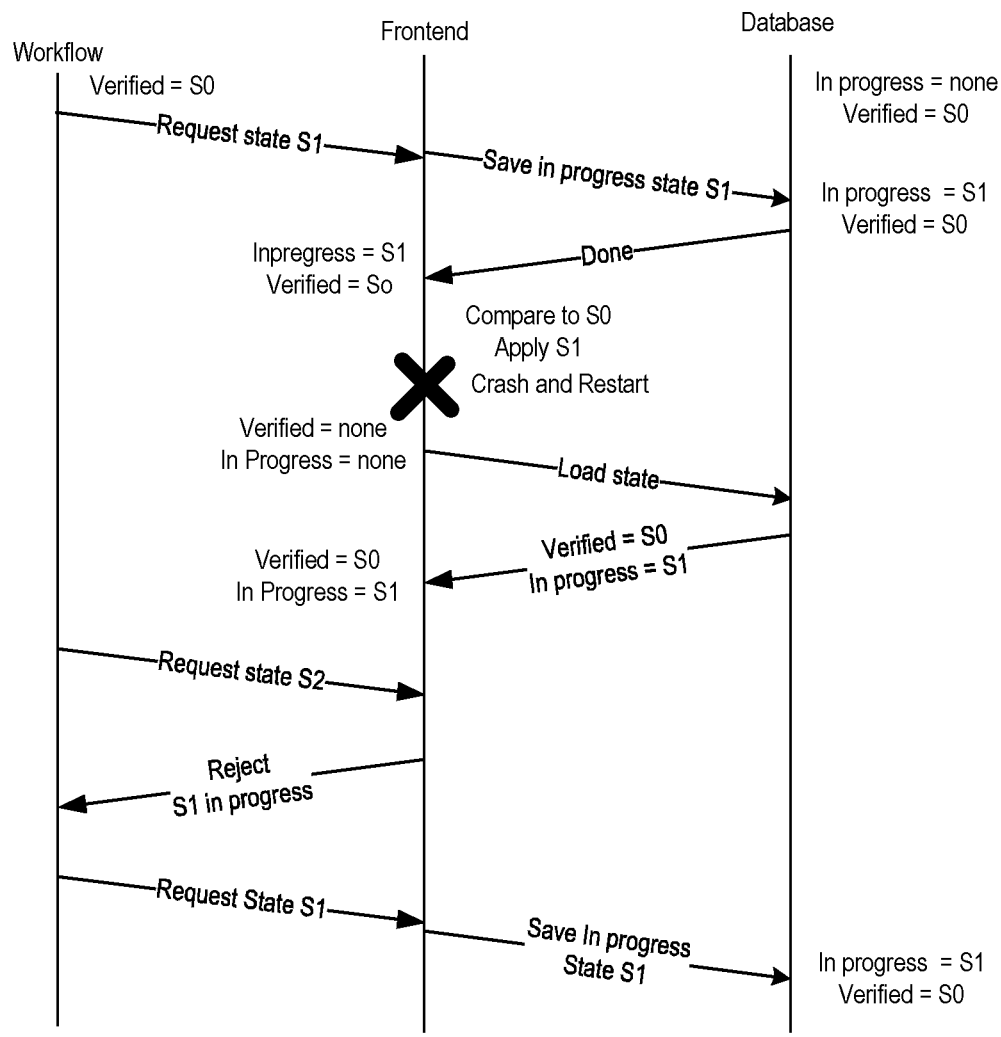
FIG. 13 is a timing diagram illustrating failover management in response to a failover during a request.

This is shown in FIG. 13, which is a timing diagram illustrating failover management in response to a failover during a request. At the time of the failure in FIG. 13, both "verified state" and "inprogress state" exist. Accordingly, upon recover, the front end 102 determines that a migration request was in progress before the failure. In this case, the fabric state is in the middle of "verified state S0" and "inprogress state S1." The workflow may determine to re-apply S1 or rollback to S0.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by a data processing system, the method comprising:
receiving a set of first intents, wherein the set of first intents describes a state of a first switch fabric within a set of network elements, the set of network elements including routers and switches;
receiving a set of second intents, wherein the set of second intents describes a state of a second switch fabric, wherein the state of the second switch fabric results from changes applied to the set of network elements;

computing, by an intent translator executing on the data processing system, a set of network operations to perform on the first switch fabric to achieve the second switch fabric, the computing including determining an order in which the network operations in the set of network operations are to be executed, and the set of network operations and the order are determined based on the set of first intents, the set of second intents, and migration logic that defines a ruleset for selecting the network operations in the set of network elements based on the set of first intents and the set of second intents; and executing, by an operation runner executing on the data processing system, the set of network operations on the set of network elements according to the order, to apply changes to the set of network elements within the first switch fabric to achieve the state of the second switch fabric within the set of network elements.

2. The computer-implement method of claim 1, wherein the set of network operations define first operations for non-cluster border routers, second operations for cluster border routers, and third operations for traffic.

3. The computer-implemented method of claim 2, wherein the first operations include enabling control of the non-cluster border routers by a switch controller proxy that can simultaneously control the non-cluster border routers according to controller logic of the first switch fabric and controller logic of the second switch fabric.

4. The computer-implemented method of claim 3, wherein the second operations include enabling migration of cluster border routers from the first switch fabric to the second switch fabric.

5. The computer-implemented method of claim 4, wherein the second operations migrate the cluster border routers according to an interleaving process during which proper subsets of the cluster border routers are migrated from the first switch fabric to the second switch fabric.

6. The computer-implemented method of claim 3, wherein the third operations include enabling migration of traffic from the first switch fabric to the second switch fabric.

7. The computer-implemented method of claim 6, wherein the third operations migrate the traffic according to an interleaving process during which portions of the traffic are migrated from the first switch fabric to the second switch fabric.

8. The computer-implemented method of claim 4, wherein the third operations include enabling migration of traffic from the first switch fabric to the second switch fabric.

9. The computer-implemented method of claim 8, wherein the third operations migrate the traffic according to an interleaving process during which portions of the traffic are migrated from the first switch fabric to the second switch fabric.

10. The computer-implemented method of claim 3, wherein the first operations include migrating the non-cluster border routers from control of the switch controller proxy to second switch fabric so that the non-cluster border routers are only controlled by the control logic of the second switch fabric.

11. The computer-implemented method of claim 2, wherein the first operations, second operations and third operations are executed to:

enable control of the non-cluster border routers by a switch controller proxy that can simultaneously control the non-cluster border routers according to controller logic of the first switch fabric and controller logic of the second switch fabric;

after enabling control of the non-cluster border routers by the switch controller proxy, migrating cluster border routers from the first switch fabric to the second switch fabric according to a cluster border router interleaving process during which proper subsets of the cluster border routers are migrated from the first switch fabric to the second switch fabric and migrating traffic from the first switch fabric to the second switch fabric according to a traffic interleaving process during which portions of the traffic are migrated from the first switch fabric to the second switch fabric; and after migrating the cluster border routers and traffic, migrating the non-cluster border routers from control of the switch controller proxy to second switch fabric so that the non-cluster border routers are only controlled by the control logic of the second switch fabric.

12. A system, comprising:

a data processing apparatus comprising one or more computers; and a non-transitory memory storage system storing instructions executable by the data processing apparatus and that upon such execution cause the data processing apparatus to perform operations comprising:

receiving a set of first intents, wherein the set of first intents describes a state of a first switch fabric within a set of network elements, the set of network elements including routers and switches;

receiving a set of second intents, wherein the set of second intents describes a state of a second switch fabric, wherein the state of the second switch fabric results from changes applied to the set of network elements;

computing, by an intent translator executing on the data processing apparatus, a set of network operations to perform on the first switch fabric to achieve the second switch fabric, the computing including determining an order in which the network operations in the set of network operations are to be executed, and the set of network operations and the order are determined based on the set of first intents, the set of second intents, and migration logic that defines a ruleset for selecting the network operations in the set of network elements based on the set of first intents and the set of second intents; and executing, by an operation runner executing on the data processing apparatus, the set of network operations on the set of network elements according to the order, to apply changes to set of network elements within the first switch fabric to achieve the state of the second switch fabric within the set of network elements.

13. The system of claim 12, wherein the set of operations define first operations for non-cluster border routers, second operations for cluster border routers, and third operations for traffic.

14. The system of claim 13, wherein the first operations include enabling control of the non-cluster border routers by a switch controller proxy that can simultaneously control the non-cluster border routers according to controller logic of the first switch fabric and controller logic of the second switch fabric.

15. The system of claim 14, wherein the second operations include enabling migration of cluster border routers from the first switch fabric to the second switch fabric.

16. The system of claim 15, wherein the second operations migrate the cluster border routers according to an interleaving process during which proper subsets of the cluster border routers are migrated from the first switch fabric to the second switch fabric.

17. The system of claim 15, wherein the third operations include enabling migration of traffic from the first switch fabric to the second switch fabric.

18. The system of claim 17, wherein the third operations migrate the traffic according to an interleaving process during which portions of the traffic are migrated from the first switch fabric to the second switch fabric.

19. The system of claim 15, wherein the third operations include enabling migration of traffic from the first switch fabric to the second switch fabric.

20. A non-transitory memory storage system storing instructions executable by a data processing apparatus and that upon such execution cause the data processing apparatus to perform operations comprising:
   receiving a set of first intents, wherein the set of first intents describes a state of a first switch fabric within a set of network elements, the set of network elements including routers and switches;
   receiving a set of second intents, wherein the set of second intents describes a state of a second switch fabric, wherein the state of the second switch fabric results from changes applied to the set of network elements;
   computing, by an intent translator executing on the data processing apparatus, a set of network operations to perform on the first switch fabric to achieve the second switch fabric, the computing including determining an order in which the network operations in the set of network operations are to be executed, and the set of network operations and the order are determined based on the set of first intents, the set of second intents, and migration logic that defines a ruleset for selecting the network operations in the set of network based on the set of first intents and the set of second intents; and
   executing, by an operation runner executing on the data processing system, the set of network elements operations on the set of network elements according to the order, to apply changes to the set of network elements within the first switch fabric to achieve the state of the second switch fabric within the set of network elements.

* * * * *